US008177052B2

(12) United States Patent
Hurst et al.

(10) Patent No.: US 8,177,052 B2

(45) Date of Patent: May 15, 2012

(54) BELT EDGE SENSOR AND ACTUATOR FOR CONTROLLING TRACKING OF SUCH BELT

(75) Inventors: James H. Hurst, Rochester, NY (US); Carl I. Bouwens, Leroy, NY (US)

(73) Assignee: Eastman Kodak Company, Rochester, NY (US)

( * ) Notice: Subject to any disclaimer, the term of this patent is extended or adjusted under 35 U.S.C. 154(b) by 288 days.

(21) Appl. No.: 12/638,109

(22) Filed: Dec. 15, 2009

(65) Prior Publication Data

US 2011/0139590 A1 Jun. 16, 2011

(51) Int. Cl.
*B65G 39/16* (2006.01)

(52) U.S. Cl. .................... 198/810.03; 198/811; 198/807

(58) Field of Classification Search ........................ None
See application file for complete search history.

(56) References Cited

U.S. PATENT DOCUMENTS

| | | | |
|---|---|---|---|
| 2,274,268 A | 2/1942 | Hercik | |
| 3,726,588 A | 4/1973 | Moser | |
| 4,189,223 A | 2/1980 | Silverberg | |
| 5,208,796 A * | 5/1993 | Wong et al. | 369/97 |
| 5,479,241 A | 12/1995 | Hou et al. | |
| 5,565,965 A * | 10/1996 | Costanza et al. | 399/167 |
| 5,815,481 A * | 9/1998 | Hou et al. | 369/97 |
| 6,377,347 B1 * | 4/2002 | Tuck et al. | 356/429 |
| 6,575,857 B2 | 6/2003 | Sebright et al. | |

* cited by examiner

*Primary Examiner* — Kavel Singh

(74) *Attorney, Agent, or Firm* — Donna P. Suchy; Christopher J. White

(57) ABSTRACT

A sensor and controller for a belt moving about a path, the sensor and controller including an analog sensor including a medium that changes a characteristic to give a signal that varies continuously with any lateral belt edge position, thus yielding improved resolution of actual belt edge position, and a control mechanism responsive to the changes in characteristics of the medium for more accurate edge position control.

5 Claims, 5 Drawing Sheets

BELT EDGE SENSOR AND ACTUATOR FOR CONTROLLING TRACKING OF SUCH BELT

FIELD OF THE INVENTION

This invention relates in general to printing apparatus having an endless belt, and more particularly to a sensor for the edge of the belt and an actuator for controlling tracking of such belt.

BACKGROUND OF THE INVENTION

In electrostatographic imaging and recording processes such as electrographic reproduction, an electrographic reproduction apparatus is utilized to form an electrostatic latent image on a primary image-forming member such as a dielectric surface and is developed with a thermoplastic toner powder to form a visible image. The visible thermoplastic toner powder image is thereafter transferred to a receiver, e.g., a sheet of paper or plastic, and the visible thermoplastic toner powder image is subsequently fused to the receiver in a fusing station using heat or pressure, or both heat and pressure.

In the reproduction apparatus, various components, such as the primary image-forming member, the transport for the receivers, and/or the fuser may include a belt movable about a closed loop path. In each instance where a belt moving about a closed loop path is used, it is important that the particular belt be accurately controlled in the movement about the closed loop path such that it is steered for proper interrelation with other components of the reproduction apparatus as a reproduction is formed. Often a section of the circumference of the closed loop transport path, or a run of the path between path-defining rollers, must be held substantially constant in the location both axially and vertically to assure desired registration between apparatus elements. Since a most desirable, compact system uses a minimum of support/steering rollers, a sever requirement is placed on the steering method in order to satisfy the physical location consistency and accuracy. Motion of the belt in a direction perpendicular to the desired transport direction must be minimized to assure registration between the apparatus components in order to form a desirable image reproduction.

In the past it was well known to track belt movement in a direction perpendicular to the transport direction by a common belt edge sensor having an array of optical sensors. The belt edge position is digitally deduced by determining which optical sensors of the array are (or are not) blocked by the belt as it is transported about the closed loop path. The overall resolution of the belt edge sensor is determined by the spacing between the optical sensors in the sensor array. As such, the ability to accurately steer the belt is dependent upon the finite relationship of optical sensor and their spacing.

SUMMARY OF THE INVENTION

The invention is directed to a sensor and controller for a belt device for use in an electrographic reproduction apparatus. The belt edge sensor and controller includes an analog sensor that gives a signal that varies continuously with any lateral belt edge positioning thus yielding a better resolution of the actual edge position for more accurate edge control.

BRIEF DESCRIPTION OF THE DRAWINGS

In the detailed description of the preferred embodiment of the invention presented below, reference is made to the accompanying drawings, in which.

DETAILED DESCRIPTION OF THE INVENTION

Figure 1:
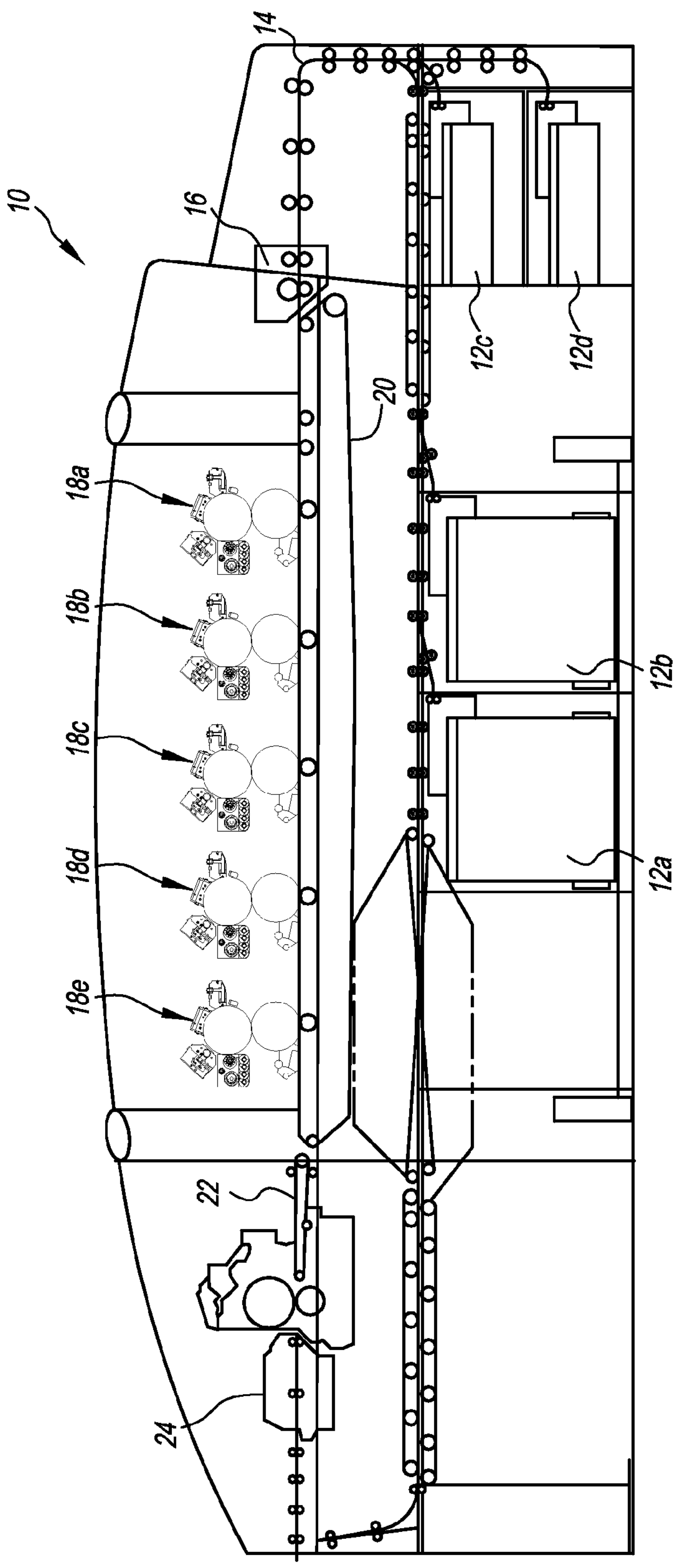
FIG. 1 shows a schematic side elevational view of a reproduction apparatus utilizing the belt edge sensor and tracking control actuator according to this invention.

Referring now to the accompanying drawings, FIG. 1 shows a schematic side elevation view of a reproduction apparatus such as a well known digital printer 10. The digital printer includes a plurality of receiver sheet supplies 12*a*, 12*b*, 12*c*, and 12*d* in operative association with a receiver sheet transport path 14. In order to accomplish desired printing, individual receiver sheets are fed seriatim from selected receiver sheet supplies for transport along the receiver sheet transport path 14 through a registration mechanism 16 to a plurality of imaging stations 18*a*, 18*b*, 18*c*, 18*d*, and 18*e*, by a moving belt sheet transport mechanism 20, where color separation images are transferred to the respective receiver sheets, such as by any well known electrographic reproduction method. In such electrographic reproduction method, in each imaging station 18*a*-18*e*, an electrostatic latent image is formed on a primary image-forming member such as a dielectric surface and is developed with a thermoplastic toner powder to form a visible image. The visible thermoplastic toner powder images are thereafter transferred in superimposed register to a receiver sheet, e.g., a sheet of paper or plastic. The combined visible thermoplastic toner powder image on the receiver sheet is transported by a second moving belt transport mechanism 22 through a fusing station 24, and fused to the receiver sheet by the fusing station 24 using heat or pressure, or both heat and pressure. The fusing station 24 can include a roller, belt, or any surface having a suitable shape for fixing thermoplastic toner powder to the receiver sheet.

Figure 2:
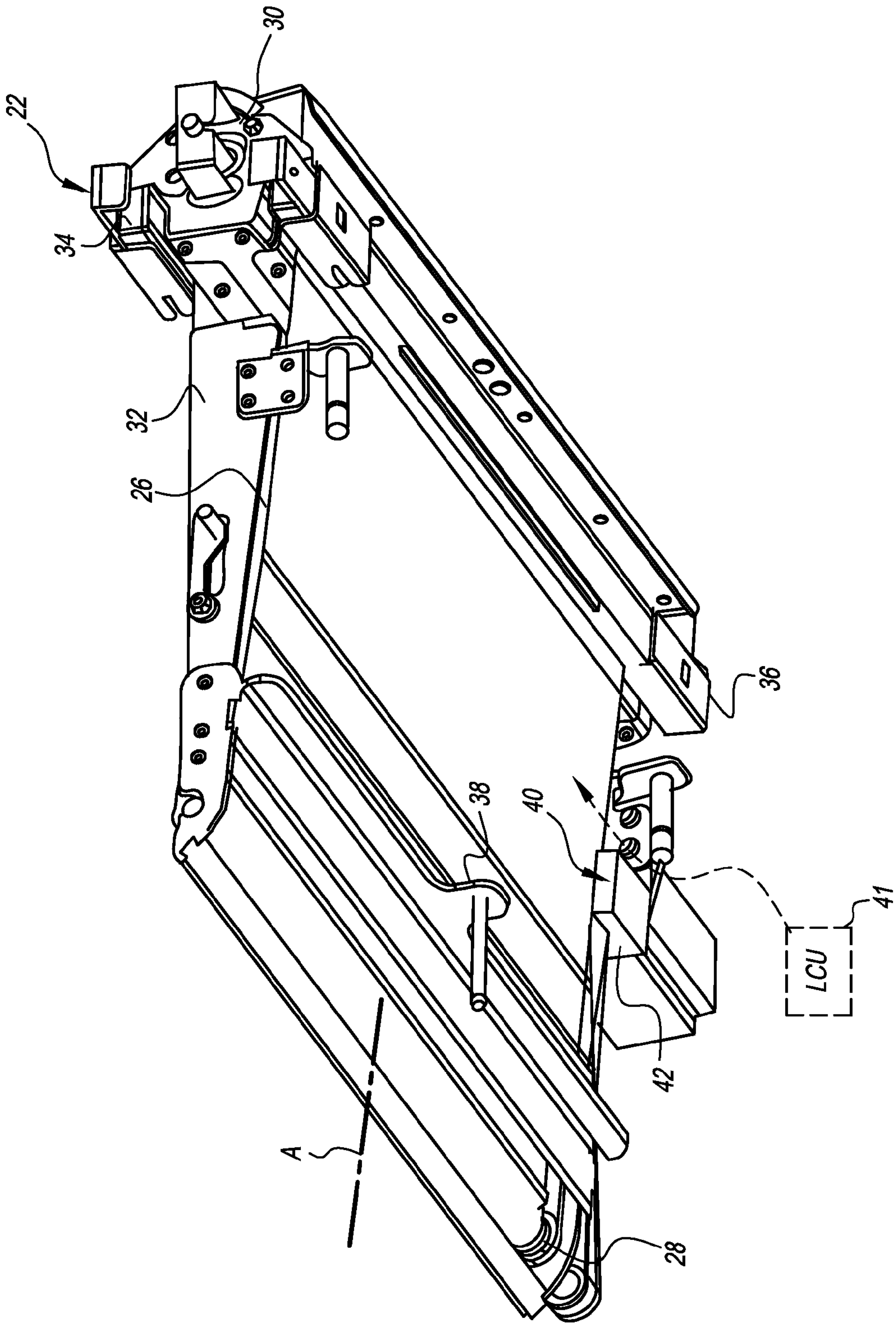
FIG. 2 is a view in perspective showing the belt support system for the reproduction apparatus utilizing the belt edge sensor and tracking control actuator according to this invention.

The present invention is directed to a sensor and control for a belt used in the transport of receiver sheets in a printer apparatus. Of course, since the typical printer apparatus as described above has various other components (such as the primary image-forming member, or the fuser) which may include a belt movable about a closed loop path, this invention is suitable for use with such other components. Particularly, this invention will be described with reference to the receiver sheet transport 22 that spans the receiver sheet transport path between the last imaging station 18*e* and the entrance to the fuser station 24. As best shown in FIG. 2, the receiver sheet transport 22 includes a continuous belt 26 entrained about two rollers 28, 30 to provide a closed loop path for the belt 26. The rollers 28, 30 are supported by a frame 32. Electrostatic chargers 34, 36 are mounted to the frame 32 respectively above and below the belt 26 adjacent to the roller 28 but could be separately supported. The charger 34 is a tack down charger that applies a charge that causes the receiver sheet to be held to the surface of the belt 26 by an electrostatic attraction, and charger 36 is a conditioning charger which removes residual charge from the belt surface prior to the arrival of the receiver sheet. A receiver sheet (not shown) is tacked to the belt 26 by the charger 34 so as to move from right to left across the top surface of the belt. The left (smaller) roller 28 is a steering roller mounted in a yoke 38. A yoke 38 supports the steering roller 28 for rotation about the longitudinal axis of the roller and pivots about an axis A that is parallel to an imaginary line that passes from the center of the larger roller 30 to the center of the smaller roller 28 (perpendicular to the longitudinal axis) along which a receiver passes.

Figure 3:
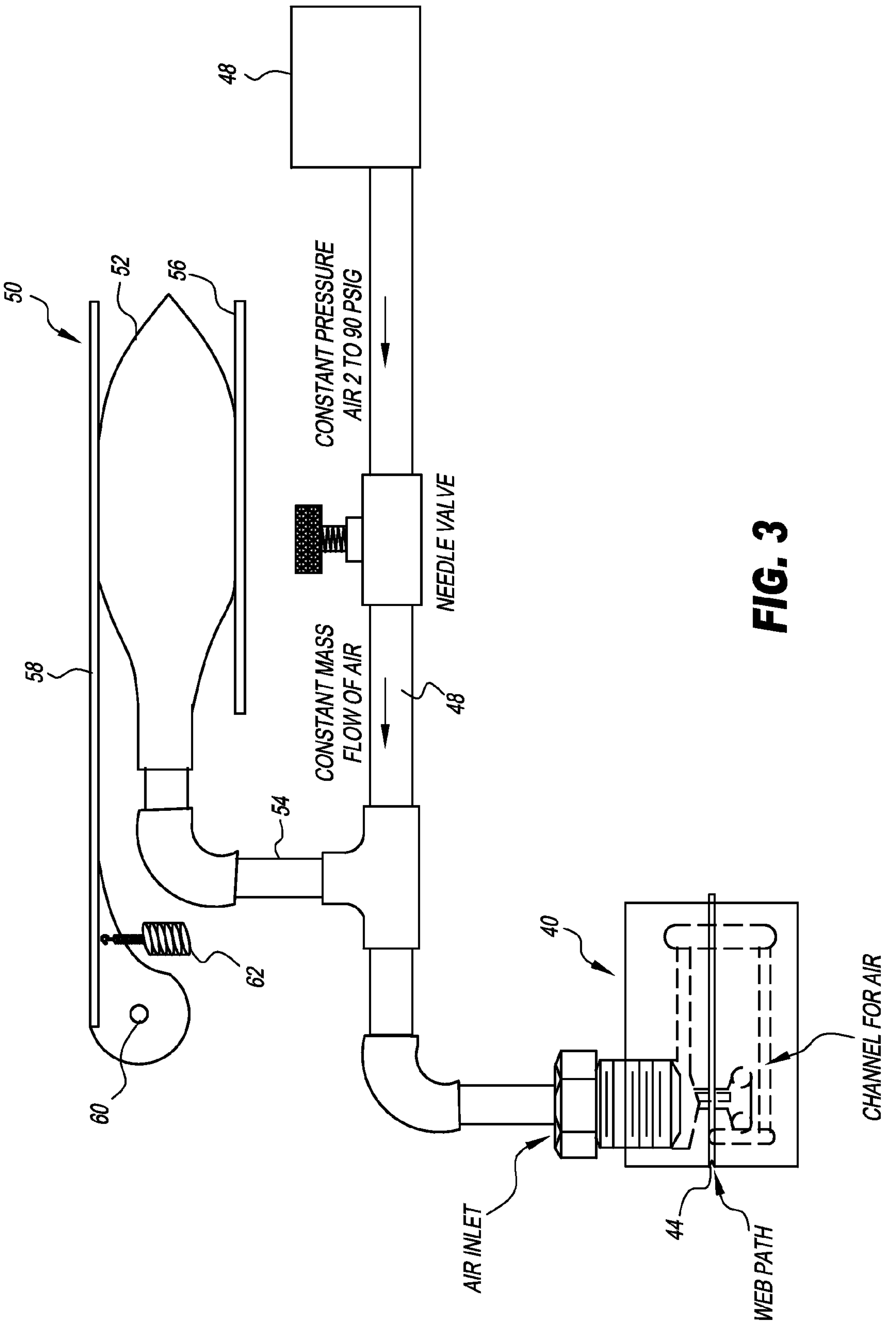
FIG. 3 is a side elevational view of the belt edge sensor and tracking control actuator as shown in according to this invention.
Figure 4:
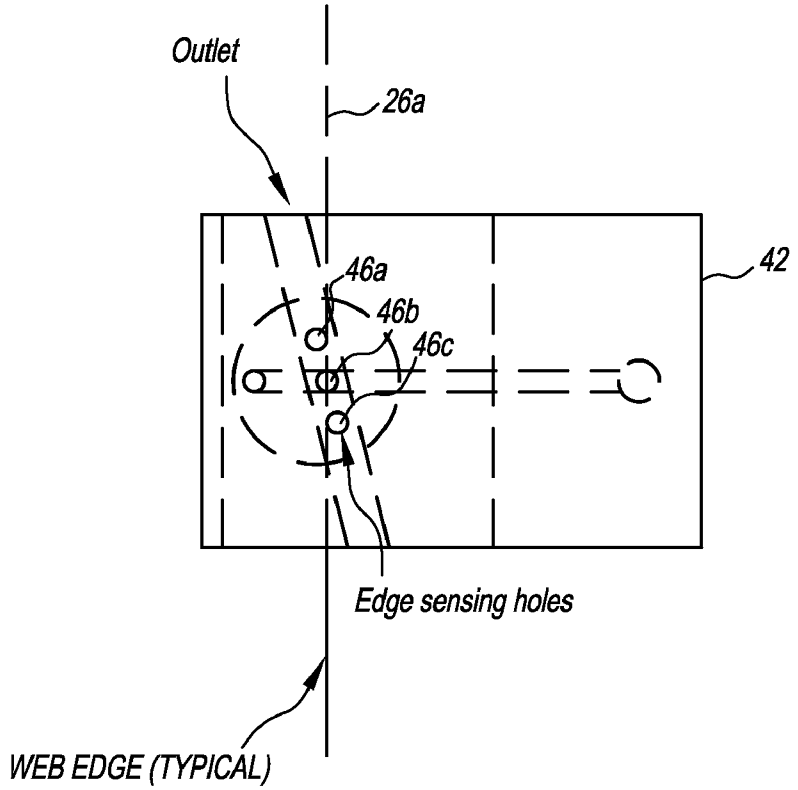
FIG. 4 is a front elevational view of the belt edge receiver block of the belt edge sensor and tracking control actuator as shown in FIG. 3.
Figure 5:
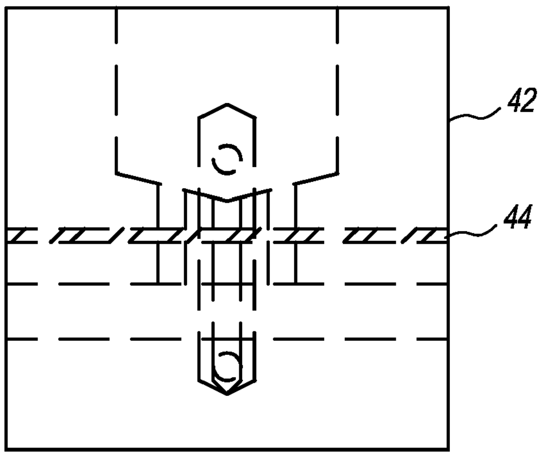
FIG. 5 is a top plan view of the belt edge receiver block of the belt edge sensor and tracking control actuator as shown in FIG. 4.

The belt edge sensor and controller, according to this invention, is designated generally by the numeral 40. The belt edge sensor, that can include an internal controller, 40 is shown mounted to the frame 32 on the underside of the belt 26. The belt edge sensor could also include a sensor 41 located separately from the belt edge sensor. This could be part of a logic printer and control unit (LCU). The belt edge sensor 40 includes a sensor unit 42 formed of a rectangular block of material having a slot 44 therein to accommodate the belt edge 26*a* (see FIGS. 3-5). The block of the sensor unit 42 has three apertures (orifices) 46*a*, 46*b*, 46*c* drilled in the block perpendicular to the belt surface that passes through the slot 44. The block is positioned so that the nominal belt edge position is at the center of the middle of the three apertures 46*a*, 46*b*, and 46*c*. A medium, such as a low pressure fluid (e.g., air), is directed in a conduit 48, at a constant flow rate, from a source S is passed through the three apertures 46*a*, 46*b*, 46*c* of the block of the sensor unit 42. The pressure drop of the fluid flow through the three apertures 46*a*, 46*b*, 46*c* is proportional to how much of the aperture area is blocked by the belt surface. If the belt moves to block more of the aperture area, the pressure drop increases. Conversely, if the belt moves to block less of the aperture area, the pressure drop decreases. The actual value of the pressure drop is thus directly related, in an analog fashion, to the location of the belt edge, and can be readily used to provide accurate feed-back indicative of the location of the belt edge relative to the nominal position thereof.

The feed-back indicative of the belt location can be used to generate a signal used to control steering of the belt to maintain the belt in the nominal position. While the feed-back could be in the form of a signal to control steering of the belt, in the preferred embodiment of this invention, the steering control is affected by using the pressure drop itself as the control signal. Accordingly, the belt edge sensor and controller 40 further includes a bladder assembly 50. The bladder assembly 50, shown in FIG. 3, has an inflatable bladder 52 connected by a conduit 54 to the conduit 48 so as to admit fluid pressure from the source S to inflate the bladder 52. Such bladder inflation thus varies according to the actual pressure drop across the apertures 46*a*, 46*b*, and 46*c* in the sensor unit 42 due to the change in pressure drop which changes the pressure in conduit 48, and thus in conduit 54 connected to the bladder 52. That is, the bladder 52 will inflate or deflate in direct proportion to the change in pressure drop caused by the increase or decrease in fluid pressure through the apertures 46*a*, 46*b*, and 46*c* due to the sensed change in location of the belt edge in the slot 44.

Figure 6:
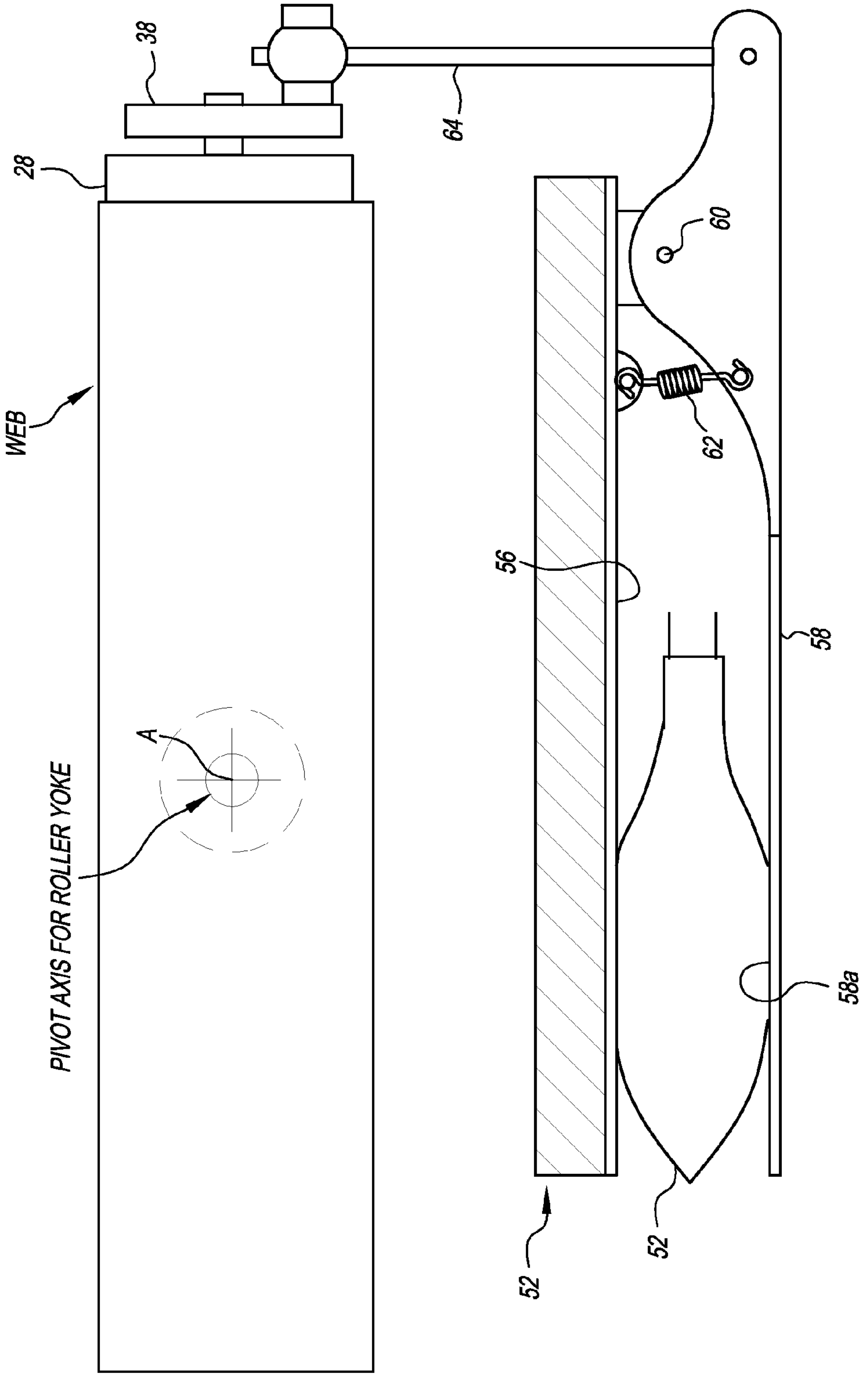
FIG. 6 is a side elevational view of the cooperative interrelation of the belt edge sensor and tracking control actuator according to this invention with the belt support system of FIG. 2.

FIG. 6 shows a bladder 52, supported on a fixed plate 56, engages an actuator arm 58 supported on a pivot pin 60. A spring 62 urges the actuator arm 58 about the pivot pin 60 into positive engagement with a paddle portion 58*a* of one end of the actuator arm 58. The bladder 52, on change in pressure loss communicated thereto, pushes on the paddle portion 58*a*, with an approximate 4:1 lever ratio, against the urging of the spring 62. The motion of the actuator arm 58 is transmitted through a linkage 64 to the yoke 38 that holds the steering roller 28 and causes the yoke 38 to pivot counter-clockwise when the bladder 52 inflates and clockwise when the bladder deflates. Pivoting of the yoke 38, in turn, rotates a center-pivoted steering roller 28 through approximately a 2" range of motion. The pivoting of the steering roller 28 causes a corresponding lateral motion of the belt 26. The lever 58, and yoke 38 are positioned such that when the belt edge is at the preferred position (sensed by the sensor unit 40 with the belt edge in the slot 44), the yoke 38 is in a neutral position that causes no lateral belt motion. When the belt edge moves away from the preferred position in the slot 44, the web edge sensor unit 40 causes a response in the bladder 52, lever 58, and yoke 38 that causes a lateral belt motion back to the preferred (neutral) belt position. The edge of belt 26 generally tracks in an axial direction such that the center of the three closely spaced apertures 46*a*, 46*b*, and 46*c* is partially covered as noted above. The inner and outer two of the apertures come into play only if there is a major disturbance of the belt tracking system (such as for example during start-up). In normal operation the belt tracking system operates smoothly, in an analog fashion, for proportional movement with almost no lateral movement of the belt. When the belt is significantly disturbed (to an off-center location) the system recovers rapidly, with oscillations about either side of the center strongly damped.

The invention has been described in detail with particular reference to certain preferred embodiments thereof, but it will be understood that variations and modifications can be affected within the spirit and scope of the invention.

PARTS LIST

10 digital printer
12*a*-12*d* receiver sheet supplies
14 receiver sheet transport path
16 registration mechanism
18*a*-18*e* imaging stations
20 moving belt receiver sheet transport mechanism
22 second moving belt receiver sheet transport mechanism
24 fusing station
26 belt
28 belt support roller
30 belt support roller
32 frame
34 tack down charger
36 conditioning charger
38 roller support yoke
40 belt edge sensor and controller
41 controller
42 sensor unit
44 slot
46*a*-46*c* apertures
48 conduit
50 bladder assembly
52 bladder
54 conduit
56 fixed plate
58 control arm
58*a* paddle portion
60 pivot
62 spring
64 linkage
A axis
S fluid source

The invention claimed is:

1. Mechanism for controlling lateral tracking of a belt about a path, the mechanism comprising:

a pressurized-fluid source adapted to provide a flow of fluid under pressure;

a sensor unit having a slot therein, the edge of the belt moving about the path arranged in the slot, the sensor unit connected to the pressurized-fluid source, three apertures in the sensor unit disposed so they are selectively closed by the edge of the belt in the slot, the apertures spaced apart in a direction lateral to the movement of the belt about the path, so that the pressure of the fluid varies in proportion to how much of the area of the apertures is blocked by the belt surface, whereby the pressure of the fluid varies in proportion to the lateral position of the belt edge in the slot;

a bladder connected to the pressurized-fluid source so that the inflation of the bladder varies according to the pressure of the fluid, a steering roller supporting the belt, the steering roller being rotatable about its longitudinal axis and about a first axis perpendicular to the longitudinal axis, wherein the first axis is substantially parallel to the direction of movement of the belt about the path;

a control arm supported on a pivot pin, the control arm engaging the bladder and being operatively connected to the steering roller, so that the rotation of the steering roller about the first axis corresponds to the inflation of the bladder, so that when the lateral position of the belt in the slot changes, the steering roller rotates around the first axis to move the belt laterally.

2. The mechanism according to claim 1 wherein the fluid is air.

3. The mechanism according to claim 1 wherein the pressure of the fluid is dependent upon the lateral position of the belt relative to a selected nominal lateral position.

4. The mechanism according to claim 1, further including a yoke supporting the steering roller and a linkage adapted to move the yoke to rotate the steering roller about the first axis.

5. The mechanism according to claim 4, wherein the linkage connects the control arm with the yoke so that, when the bladder inflates, the control arm rotates in corresponding relation to the inflation and moves the linkage to cause the linkage to move the yoke to rotate the steering roller about the first axis.

* * * * *